US006530488B1

(12) United States Patent
Krammes, Jr.

(10) Patent No.: US 6,530,488 B1
(45) Date of Patent: Mar. 11, 2003

(54) FISHING LURE HOLDER AND DISPLAY FOR TACKLE BOXES AND BOATS

(76) Inventor: Gary L. Krammes, Jr., 1555 Sweet Arrow Rd., Pottsville, PA (US) 17901

( * ) Notice: Subject to any disclaimer, the term of this patent is extended or adjusted under 35 U.S.C. 154(b) by 0 days.

(21) Appl. No.: 09/023,936

(22) Filed: Sep. 25, 1998

Related U.S. Application Data

(63) Continuation-in-part of application No. 08/724,165, filed on Sep. 27, 1996, now abandoned.

(51) Int. Cl.⁷ .................................................. A47F 7/00
(52) U.S. Cl. .............................. 211/85.29; 211/85.15; 211/116; 43/54.1; 206/806; 224/920; 224/406
(58) Field of Search ........................ 211/85.29, 85.15, 211/116, 115, 89.01, 94.01, 162; 43/54.1; 206/806; 224/920, 406

(56) References Cited

U.S. PATENT DOCUMENTS 2,781,959 A * 2/1957 Loveland
3,395,788 A * 8/1968 Gill
3,398,839 A * 8/1968 Balleager et al.
3,563,430 A * 2/1971 Forrest
3,690,448 A * 9/1972 Switzer
3,832,798 A * 9/1974 Pilston ........................ 43/54.1
4,101,042 A * 7/1978 Strong et al. ........... 206/806 X
4,154,383 A * 5/1979 Honatzis ................. 206/806 X
4,314,646 A * 2/1982 Purnell ........................ 211/113
5,410,836 A * 5/1995 Hardy ..................... 43/54.1 X
5,425,196 A * 6/1995 Schwarze ................... 43/54.1
6,039,191 A * 3/2000 Purnell ........................ 211/118

* cited by examiner

Primary Examiner—Robert W. Gibson, Jr.
(74) Attorney, Agent, or Firm—Sanford J. Piltch, Esq.

(57) ABSTRACT

A fishing lure storage and display apparatus is provided which features transparent storage receptacles releasably suspended from a hanging rod allowing the lures to be easily viewed and readily accessed. The storage receptacles retain the lure in isolation from the outer environment thus sustaining the shape, color and scent of the lure and protecting it from crushing damage or entanglement. The receptacles can take on a variety of forms such as a flexible polypropylene pouch or a tubular member constructed from a semi-rigid plastic.

12 Claims, 4 Drawing Sheets

FISHING LURE HOLDER AND DISPLAY FOR TACKLE BOXES AND BOATS

This application is a continuation-in-part of U.S. patent application Ser. No. 08/724,165, filed Sep. 27, 1996, now abandoned.

BACKGROUND OF THE INVENTION

This invention relates to devices for storing, handling and displaying fishing lures. In particular, this invention relates to a storage and display apparatus which is mounted on the inside of a tackle box or a storage compartment of a boat, allowing for easy access and removal of the fishing lures while providing a protective storage environment.

A constant concern for fishermen is the proper storage of lures which are often intricately designed and expensive. In order to provide easy access to lures and prevent them from being damaged, they are stored in tackle boxes or specially built storage compartments on boats. Even when stored in a tackle box, however, lures can become entangled on the hooks and lines of other lures or tackle. When the fisherman wants to retrieve the desired lure he must untangle it from the other lures which can cause damage. Moreover, when untangling a lure, the hooks form the other lures can often prick or cut the fisherman. In addition, when lures are stored in an open tackle box, they tend to lose qualities, such as special scents, which aid in attracting fish.

One example of a previous attempt to provide a storage device for fishing lures which prevents damage to the lures and allows for easy access is disclosed in U.S. Pat. No. 3,832,798 [Pilston]. Pilston discloses a container having an elongated transparent housing which envelopes the lure and is designed to be worn by the fisherman on a belt or necklace. Pilston fails, however, to disclose a storage device which can be used with tackle boxes and storage areas in boats and is only effective when worn about the fisherman's body. Thus, once the device is removed from the fisherman, it will be placed in a tackle box where the exposed lines and clasps can become entangled with other lures in the box or storage area.

Thus, it is desired to provide a storage and display apparatus for fishing lures, adapted for use with a tackle box or storage area, which will protect the lures from damage while preventing them from becoming entangled with other lures stored in the tackle box or storage area.

Accordingly, it is an object of the present invention to provide a storage and display apparatus for fishing lures which is adapted for use within a tackle box or storage area of a boat.

It is a further object of the present invention to provide a storage and display apparatus for fishing lures which protects and isolates each of the lures stored therein.

It is a further object of the present invention to provide a storage and display apparatus for fishing lures which prevents the lures from becoming entangled with other lures and tackle stored in a tackle box or storage area of a boat.

It is a further object of the present invention to provide a storage and display apparatus for fishing lures which allows the lures to be easily removed and replaced within the storage device.

Still further, it is an object of the present invention to provide a storage and display apparatus for fishing which clearly displays the lures.

Other objects, advantages and novel features of the present invention will become apparent from the following detailed description of the invention when considered in conjunction with the accompanying drawings.

SUMMARY OF THE INVENTION

The fishing lure storage and display apparatus of the present invention features a transparent storage receptacle releasably suspended from a hanging rod. The transparent storage receptacle retains the lure and isolates it from the outer environment thus sustaining the scent of the lure and protecting it from damage. The transparent receptacle can take on a variety of forms such as a flexible polypropylene pouch or a tubular member constructed from a semi-rigid plastic.

The fishing lure storage and display apparatus may be mounted in a tackle box or storage area by support clips which are attached to the top of the tackle box or storage area. The hanging rod is then inserted into the support clips in a manner which will allow the rod to freely rotate about its longitudinal central axis. Thus, when the storage and display apparatus is installed in the lid of a tackle box, the rod will rotate about its longitudinal central axis as the tackle box is opened allowing the lures to be easily viewed and readily accessed.

A means for releasably suspending each of the transparent storage receptacles is attached to the hanging rod. The releasable suspension means can either be fixedly mounted to the rod at pre-determined spacing or maybe attached in a manner so that it is free to rotate about the rod. The preferred releasable suspension means is a swivel hook and spring biased jaw assembly cooperating juxtaposed hook and loop fasteners. The swivel hook is attached directly to the hanging rod and the spring biased jaws or hook and loop fasteners engage and hold the transparent storage receptacle. The transparent storage receptacle is releasably held within the jaws by squeezing a release handle located at the proximal end of the spring biased jaws. Once the handle is squeezed, the jaws open, and the transparent receptacle is placed within the jaws. The handle is then released and the jaws close tightly gripping and holding the transparent receptacle. The hook and loop fasteners may also suspend the storage receptacle with cooperating juxtaposed fasteners attached to the storage receptacle as well.

BRIEF DESCRIPTION OF THE DRAWINGS

For the purpose of illustrating the invention, there is shown in the drawings an embodiment of the invention which is presently preferred; it being understood, however, that this invention is not limited to precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
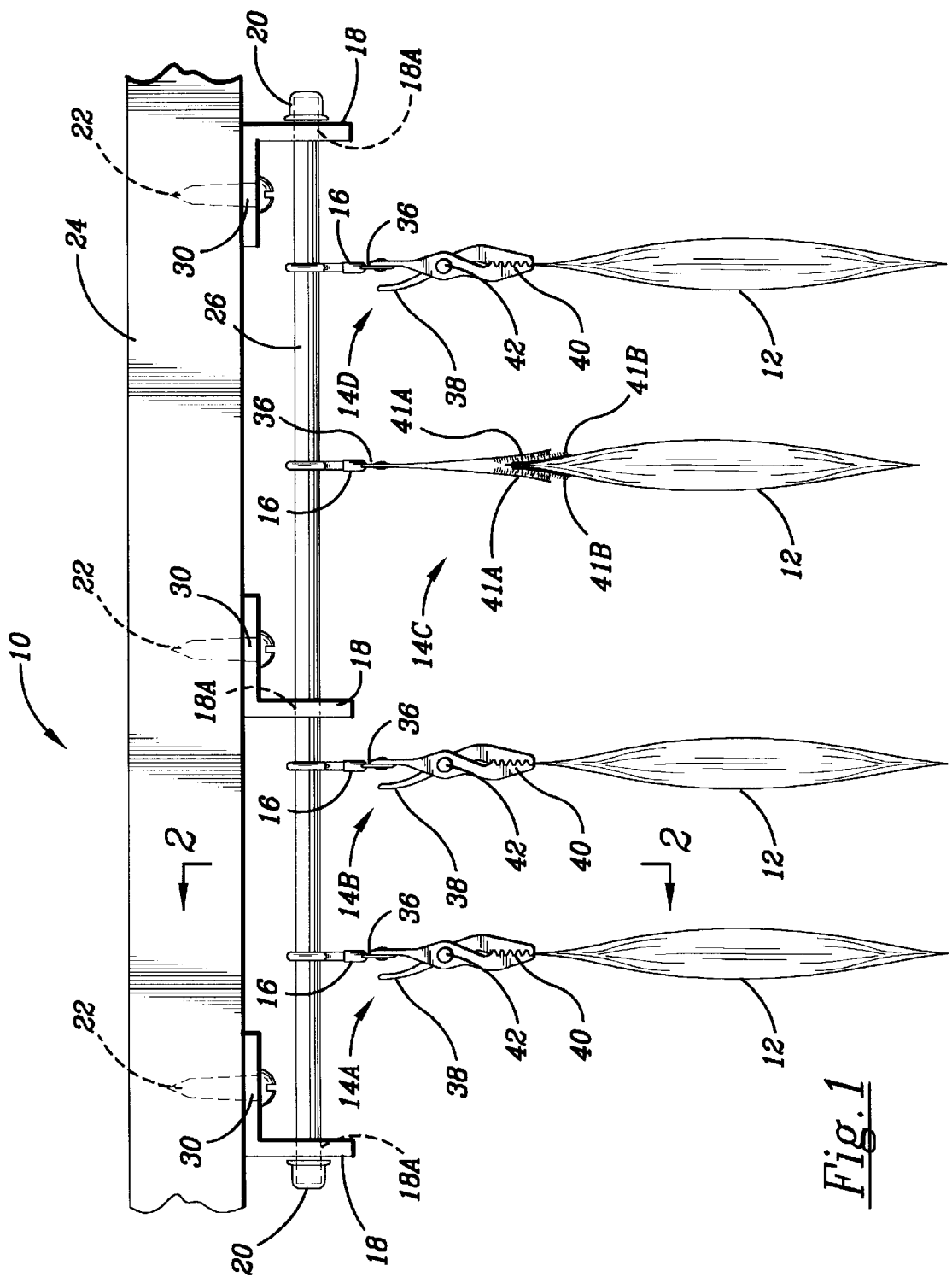
FIG. 1 is a front view of a first embodiment of the fishing lure storage and display apparatus of the present invention.

Referring now to the drawings wherein the same reference numbers indicate the same elements, there is shown in FIG. 1 the fishing lure storage and display apparatus 10 of the present invention Storage and display apparatus 10 features storage receptacles 12 detachably suspended from hanging rod 26. As shown in FIG. 1, rod 26 is mounted to a support member, in this case to the lid 24 of a tackle box by mounting brackets 18. The number of mounting brackets 18 which are utilized will depend upon the overall length of the rod 26 and the tackle box into which the storage and display apparatus 10 is to be installed. For illustrative purposes three mounting brackets 18 are shown as supporting the rod 26 in FIG. 1.

Figure 4:
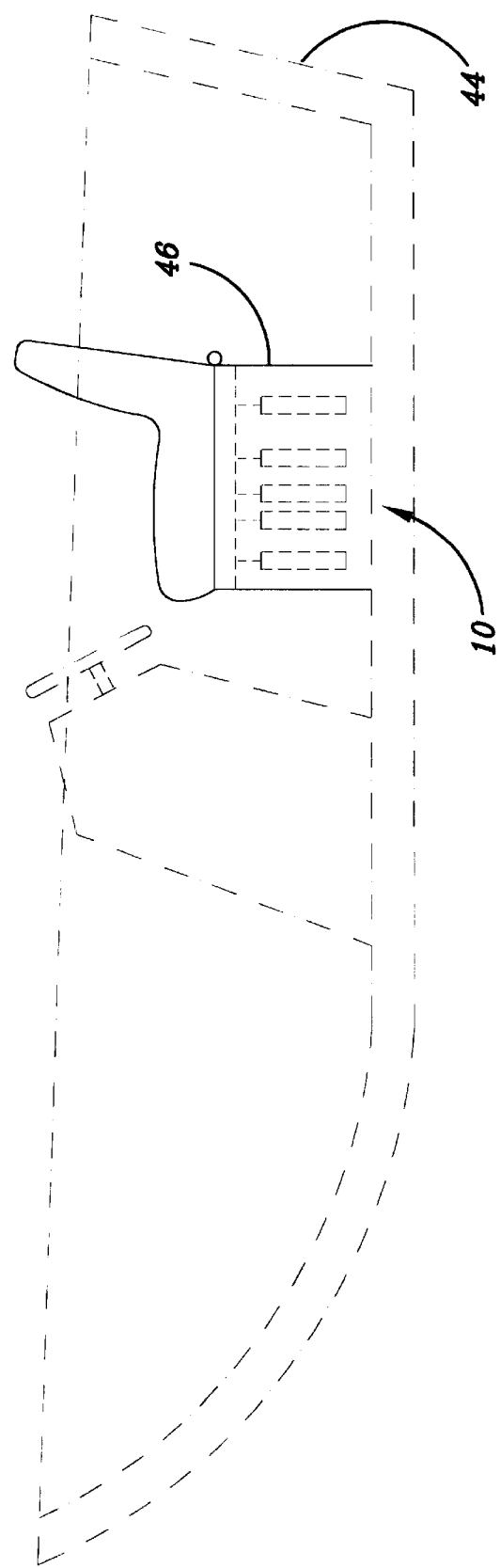
FIG. 4 is a pictorial view showing the fishing lure storage and display device of the present invention positioned within a storage compartment of a boat.

The mounting brackets 18 are secured into the lid 24 by inserting threaded members 22 through apertures 30 into the lid 24 of the tackle box, or the top of a storage compartment 46 of boat 44 as shown in FIG. 4. If threaded members 22 are not compatible for use with the tackle box or storage compartment 46, the mounting brackets 18 may be secured by other means such as a magnetic fastener, glue or a hook and loop type of attachment. Once the brackets 18 are secured to the lid 24, the rod 26 is inserted through apertures 18A (shown in phantom) in each respective bracket 18 and end caps 20 are placed on the ends of the rod 26 to retain the rod in position within the brackets 18. Apertures 18A are of sufficient size to allow rod 26 to rotate about its central longitudinal axis so that as the lid 24 of the tackle box is opened, the rod 26 will rotate so that the lures will be suspended in a substantially vertical position permitting the fisherman to view and select whichever lure is desired to be used.

Figure 2:
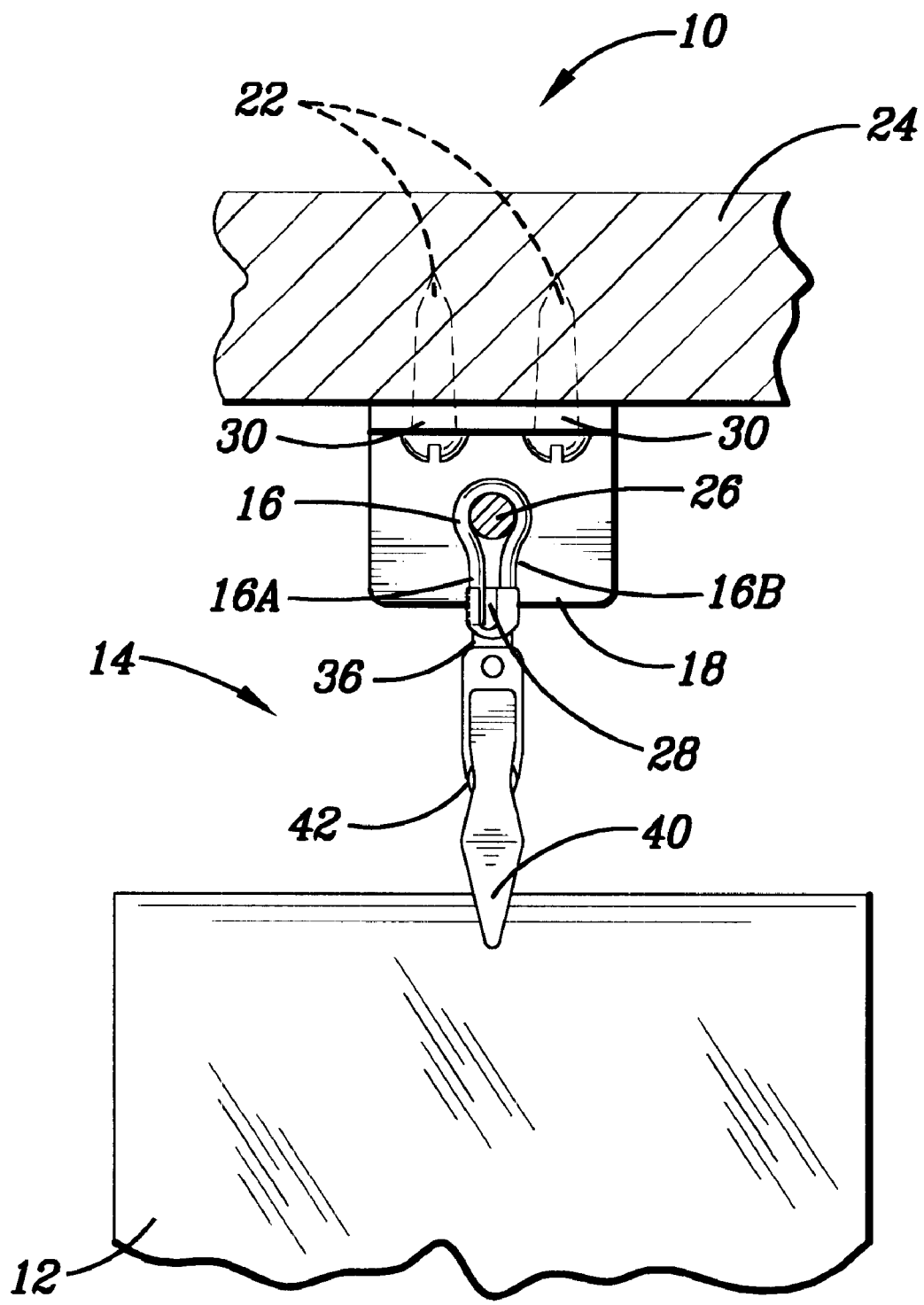
FIG. 2 is a section view taken along Line 2—2 of FIG. 1, showing further details of the fishing lure storage and display apparatus of the present invention.

The fishing lures are separately stored by inserting each one into separate transparent storage receptacles 12, to be described more fully below, and suspended from rod 26 by a plurality of detachable suspension means 14A–D. As shown in FIGS. 1 and 2, the detachable suspension means 14A may be a swivel hook 16 and spring biased gripping assembly 40 or cooperating juxtaposed hook and loop fasteners 41A, 41B distending from detachable suspension means 14C. In one preferred construction the swivel hook 16 is attached in pre-determined spaced locations along rod 26 so that each suspension means 14A, B is not free to slide along, but still rotate about, rod 26. In another construction, however, rod 26 may be fixedly attached and not free to rotate about its longitudinal central axis so that the swivel hook 16 is attached so that it is free to slide along and rotate about rod 26 such as suspension means 14c,d.

Whether free to slide along and rotate about rod 26 or not, swivel hook 16 can be removed from rod 26 by swivel hook release 28 as shown in FIG. 2. Swivel hook release 28 is a slotted groove into which the free end 16A of swivel hook 16 is placed. In the same manner as a safety pin, swivel hook 16 can be removed from rod 26 by squeezing the free end 16A and the fixed end 16B of swivel hook 16 together and removing the free end 16A from swivel hook release 28. Once this is accomplished, swivel hook 16 springs open and is free to be removed from rod 26.

Transparent storage receptacles 12 are suspended from one of the detachable suspension means 14. Each receptacle 12 is gripped by releasable suspension means such as a spring biased grip 40 which is retained in the closed gripping position by a biasing spring (not shown) which permits the jaws of the grip 40 to swivel in a reciprocating manner about pivot pin 42. Each grip 40 is attached to the distal end of swivel hook 16 by an extension plate 36 and secured by a permanent fastening means, e.g. a rivet or a weld. As shown in FIGS. 1 and 2, storage receptacle 12 is comprised of a polypropylene pouch which is sufficiently flexible to accommodate a wide range of sizes and shapes of fishing lures. Moreover, pouch 12 isolates each fishing lure preserving its attraction qualities, e.g. shape, color and scent, while preventing any damage to the lure from crushing or entanglement.

In order to place a lure within the polypropylene pouch 12, grip release handle 38 is squeezed toward extension plate 36 which opens grip 40 freeing pouch 12. Once released, the pouch 12 is opened, the lure placed inside, and the pouch 12 reclosed. The pouch 12 is then repositioned into the grip 40 to be suspended from the rod 26 for storing and display.

Alternatively, detachable suspension means 14 may also be comprised of hook and loop fasteners 41A, 41B attached to the extension plate 36 so that the hook and loop fasteners 41A are attached to the plate 36 and the cooperating fasteners 41B are attached facing outward along the top of receptacle 12 which mate with the opposing fasteners 41A attached to the swivel hook 16 thus suspending receptacle or pouch 12 therebetween. In order to place a lure within the polypropylene pouch 12, one need only rip the pouch 12 away from the fastener 41A suspended from extension plate 36 and place the lure within the pouch as described above. Of course, only one set of hook and loop fasteners 41A, 41B are needed on a single side of the receptacle 12 to accomplish the removal and reattachment of the receptacle from the detachable suspension means 14.

Figure 3:
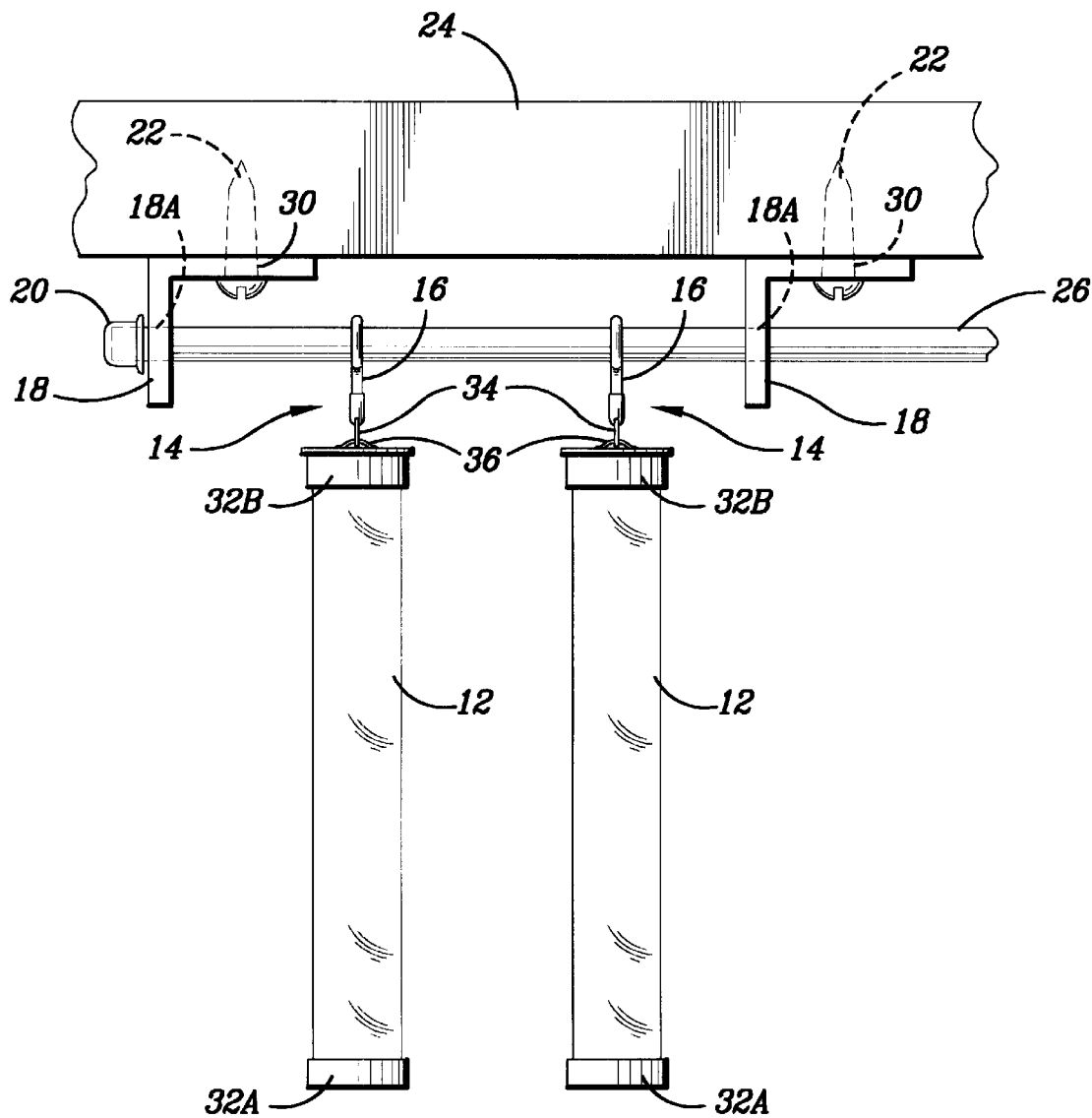
FIG. 3 is a front view of a second embodiment of the fishing lure storage and display apparatus of the present invention.

FIG. 3 illustrates a second embodiment of the present invention in which flexible plastic tubes are utilized as storage receptacles 12 for individual fishing lures. As shown in FIG. 3, detachable suspension means 14 is comprised of swivel hook 16 with the extension plate 36 connected directly to a suspension ring 34 incorporated into top cap 32B of receptacle 12 Top cap 32B fits around the outer circumference of tube 12 creating a tight seal which allows tube 12 to be inserted into cap 32B and remain suspended until a later desired removal. Bottom cap 32A also fits around the outer circumference of tube 12, but is also removable.

In order to remove or replace a lure, one may remove the bottom cap 32A leaving tube 12 suspended from releasable suspension means 14. Alternatively, to gain access to the lure, one may grasp the tube 12 and pull it away from top tap 32B removing tube 12 from the releasable suspension means 14. Once tube 12 is opened by either the bottom cap 32A being removed, or by tube 12 being pulled from top cap 32B, a lure may be placed in tube 12 and the bottom cap 32A replaced or the tube 12 re-inserted into top cap 32B to be suspended from the rod 26 for storing and display.

In operation, the mounting brackets 18 are placed into the lid 24 of the tackle box or the storage area 46 of a boat 44 by inserting threaded members 22 through apertures 30 and into the lid 24 or top of storage area 46. Once the mounting brackets 18 are installed, rod 26 may be inserted through apertures 18A and rod retainer caps 20 are placed on the end of the rod 26. Each of the releasable suspension means 14 may then be attached to rod 26 by pressing the free end 16A and fixed end 16B of swivel hook 16 together thus allowing free end 16A to be removed from swivel hook release 28.

Once the free end 16A is removed from swivel hook release 28, swivel hook 16 is in an open position and is placed around rod 26 at any desired position along the length of the rod.

If a polypropylene pouch is used as the transparent receptacle 12, then grips 40 (or hook and loop fasteners 41A) are attached to the extension plate 36 at the distal end of each swivel hook 16 of the releasable suspension means 14. A lure may be placed in pouch 12 by squeezing grip release handle 38 and removing pouch 12 from suspension means 14. Once a lure is placed within pouch 12, it may then be replaced in grip 40 by squeezing release handle 38, placing pouch 12 within the cooperating jaws of grip 40 and releasing handle 38 thus closing jaws 40. The same may be accomplished by working the hook and loop fasteners 41A, 41B apart and then back together.

If a flexible plastic tube is used as the transparent receptacle 12, one may either remove the bottom cap 32A leaving tube 12 suspended from releasable suspension means 14 or grasp the tube 12 and pull it away from top cap 32B completely removing tube 12 from releasable suspension means 14. Once the bottom cap 32A is removed or tube 12 is removed from suspension means 14, a lure may be placed in tube 12 and the bottom cap 32A replaced or the tube 12 re-inserted into top cap 32B.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A storage and display apparatus for one or more fishing lures adapted to be dependingly supported within a storage compartment comprising:

two or more transparent receptacle means into which said one or more fishing lures are placed;

a rod mounted to the inside of said storage container in a manner which allows said rod to freely rotate about its longitudinal central axis; and means for detachably suspending said two or more transparent receptacle means from said rod.

2. The storage and display apparatus for fishing lures of claim 1, wherein said transparent receptacle means comprises a closable pouch constructed of polypropylene.

3. The storage and display apparatus for fishing lures of claim 1, wherein said transparent receptacle means comprises a closable tube constructed from a semi-rigid plastic material.

4. The storage and display apparatus for fishing lures of claim 1, wherein said means for detachably suspending said two or more transparent receptacle means comprising a swivel hook fixedly positioned at pre-determined spaced locations onto said rod.

5. The storage and display apparatus for fishing lures of claim 4, wherein said means for detachably suspending said transparent receptacle further comprising a set of spring biased jaws fixedly attached to said swivel hook.

6. The storage and display apparatus for fishing lures of claim 1, wherein said means for detachably suspending said one or more transparent receptacle comprises a set of spring biased jaws fixedly attached at their proximal end to a swivel hook, said swivel hook being releasably attached to said rod and free to rotate about the longitudinal central axis of said rod.

7. The storage and display apparatus for fishing lures of claim 4, wherein said means for detachably suspending said transparent receptacle further comprising cooperating juxtaposed hook and loop fasteners attached to said swivel hook and to said two or more transparent receptacle means.

8. The storage and display apparatus for fishing lures of claim 1, wherein said means for detachably suspending said one or more transparent receptacles comprises cooperating juxtaposed hook and loop fasteners attached to both the proximal end to said swivel hook and to said two or more transparent receptacle means, said swivel hook being releasably attached to said rod and free to rotate about the longitudinal central axis of said rod.

9. The storage and display apparatus for fishing lures of claim 1, wherein said means for detachably suspending said two or more transparent receptacle means comprising a swivel hook slidably positionable on said rod.

10. The storage and display apparatus for fishing lures of claim 9, wherein said means for detachably suspending said two or more transparent receptacle means further comprising a set of spring biased jaws fixedly attached to said swivel hook.

11. The storage and display apparatus for fishing lures of claim 9, wherein said means for detachably suspending said two or more transparent receptacle means further comprising cooperating juxtaposed hook and loop fasteners attached to said swivel hook and said one or more transparent receptacle means.

12. The storage and display apparatus for fishing lures of claim 9, wherein said means for detachably suspending said two or more transparent receptacle means comprises cooperating juxtaposed hook and loop fasteners attached to both the proximal end to said swivel hook and to said one or more transparent receptacle means, said swivel hook being releasably attached to said rod and free to rotate about the longitudinal central axis of said rod.

* * * * *